US006278571B1

(12) United States Patent
Bui et al.

(10) Patent No.: US 6,278,571 B1
(45) Date of Patent: Aug. 21, 2001

(54) ADAPTIVE SERVO GAP DETECTION FOR TIMING BASED SERVO

(75) Inventors: Nhan Xuan Bui, Tucson, AZ (US); Junichi Fukuda, Sagamihara (JP); Glen Alan Jaquette; John Alexander Koski, both of Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,078

(22) Filed: May 19, 1999

(51) Int. Cl.[7] .............................. G11B 5/584; G11B 5/55
(52) U.S. Cl. ..................... 360/77.12; 360/78.02
(58) Field of Search ........................ 360/51, 48, 77.12, 360/78.02

(56) References Cited

U.S. PATENT DOCUMENTS 5,689,384 * 11/1997 Albrecht et al. .................. 360/77.12

* cited by examiner

Primary Examiner—Regina Y. Neal
(74) Attorney, Agent, or Firm—John H. Holcombe; Robert M. Sullivan (57) ABSTRACT

Disclosed are a method and a detector for adaptively detecting servo gaps in a timing based servo pattern prerecorded on a variable velocity media. The timing based servo pattern has groups of repeated pairs of non-parallel transition stripes arranged in bursts, the bursts separated by servo gaps whose length is variable. A servo system sensor senses the transition stripes in the longitudinal direction of the media. A group interval detector coupled to the sensor detects the timing interval between the same slope transition stripes of two sequential groups of bursts. A divider divides the detected group timing interval by a predetermined divisor to provide a divided timing interval gap detection threshold. A sequential stripe interval detector coupled to the sensor measures the timing interval between stripes, and a comparator compares the divided timing interval and the timing interval, identifying a servo gap upon the measured timing interval at least equaling the gap threshold. The detector responds to "valid" signals which indicate the validity of the detected group timing interval, repeating operation of the divider to update the gap threshold, and repeating operation of the comparator with the updated gap threshold to continue to identify the servo gaps.

30 Claims, 6 Drawing Sheets

ADAPTIVE SERVO GAP DETECTION FOR TIMING BASED SERVO

DOCUMENTS INCORPORATED BY REFERENCE

Commonly assigned U.S. Pat. No. 5,689,384 is incorporated for its showing of a timing based track following servo system for magnetic tape systems.

TECHNICAL FIELD

This invention relates to timing based servo systems for longitudinal recording, and, more particularly, to detecting gaps between bursts of timing based servo transitions.

BACKGROUND OF THE INVENTION

One method of implementing magnetic tape devices to maximize capacity is to maximize the number of parallel tracks on the tape. The typical way of maximizing the number of tracks is to employ servo systems which provide track following and allow the tracks to be spaced very closely. Even so called "low end" tape devices are now employing track following to maximize the number of tracks.

An example of track following servoing is the provision of groups of prerecorded parallel longitudinal servo tracks that lie between groups of longitudinal data tracks, so that one or more servo heads may read the servo information and an accompanying track following servo will adjust the lateral position of the head or of the tape to maintain the servo heads centered over the corresponding servo tracks. The servo heads are spaced a defined distance from the data heads, so that centering the servo heads results in the data heads being centered over the data tracks. The defined distance is maintained for all tape drives in a particular family allowing exchange of tape media between tape drives in the same or compatible families.

An example of a track following servo system particularly adapted to magnetic tape comprises that of the incorporated '384 patent. The servo patterns are comprised of magnetic flux transitions recorded in continuous lengths at non-parallel angles, such that the timing of the intervals between servo transitions read from the servo pattern at any point on the pattern varies continuously as the head is moved across the width of the servo pattern. For example, the pattern may comprise sloped or slanted transitions with respect to the length of the track alternating with oppositely sloped or slanted transitions, each comprising a pair of transitions. Thus, the relative timing of the intervals between transitions read by a servo read head varies linearly depending on the lateral position of the head. Speed invariance is provided by utilizing a group of interlaced pairs of transitions, arranged in two bursts in a group, and determining the ratio of two timing intervals, the interval between two like transitions compared to the interval between two dissimilar transitions. Synchronization of the decoder to the servo pattern may be accomplished by having two separate groups of bursts of pairs of transitions, each group having a different number of pairs of transitions in the bursts. Thus, the position in the set of groups is readily determined by knowing the number of pairs of transitions in the present group.

Timing of the intervals between transitions requires identification of the separate bursts in each of the groups. Each of the bursts is separated by a gap which is employed to identify the end of one burst and the beginning of the next. The gaps are determined by comparing the interval between sequential transitions against a gap detection threshold. If the interval is less than the threshold, the transitions are assumed to be within a burst, and if the interval is equal to or greater than the threshold, a gap between bursts is assumed.

Tape speeds are subject to significant variation. The tape speed and rate of data transfer often are different, or the data transfer is intermittent due to other operations of the host computer system, resulting in the need to stop and subsequently restart the motion of the tape. Further, the tape drive operates in different modes, some of which require that the tape media be speeded up or slowed significantly. When the tape is moving slowly, the transitions appear to be far apart, such that the interval between adjacent transitions within a burst may have a timing which exceeds the threshold and thus appears to be a gap between bursts. Thus, the servo gap identification may easily be lost, which, in turn, loses the servo tracking capability of the tape drive.

Certain high capacity and high speed tape drives are equipped with an incremental encoder, or tachometer, which provides a precise positioning signal to counters which monitor media position and which may be used with appropriate microcode in the tape control unit to determine the instant speed of the tape media and calculate a new threshold and identify the servo gaps.

Cost reduction is of key importance in modern tape drives and other longitudinal media drives. Precision incremental encoders are expensive and it is desirable to provide an alternative, which may allow the elimination of the incremental encoder.

Ideally, the servo gap detection threshold is updated during the tape speed variation, or at least as soon as possible after the tape speed is varied. Conventionally, the tape speed and the servo gap detection threshold are calculated by the microcode at a tape transport timer interrupt, and the threshold is set as a register value if needed. The calculation and update of the servo gap detection threshold are a microcode overhead. Further, the control unit processor performs a number of interrupt driven operations, and may be unable to service the servo gap interrupt and then calculate the servo gap detection threshold at every tape transport timer interrupt. Moreover, if an abnormality occurs in the servo system, and the tape speed had been stable, the microcode may not monitor and update the threshold and identify the gaps even though the tape speed is still available. As the result, the previously set gap threshold may no longer be correct as the tape speed is varied, such that not all the servo gaps are sensed or intervals between adjacent transitions in a burst are erroneously sensed as servo gaps.

A simplistic solution is to wait for the tape velocity to fully stabilize at the new nominal value and use a fixed servo gap detection threshold. This approach would overly limit the operating range of the tape servo system and markedly degrade the data handling ready time for the tape drive.

SUMMARY OF THE INVENTION

An object of the present invention is to provide efficient and precision identification of the servo gaps and updating of the servo gap detection threshold in timing based servo systems.

Another object of the present invention is to continuously identify the servo gaps and update the servo gap detection threshold on a continuing basis without the constant requirement of processor intervention.

Disclosed are a method and a detector for adaptively detecting servo gaps in a timing based servo pattern prerecorded on a media. The timing based servo pattern has groups of repeated pairs of non-parallel transition stripes arranged in two bursts, one of each of the pairs in one of the bursts, the bursts separated by servo gaps whose length is variable in the longitudinal direction of the media based on the lateral position on the servo pattern. Thus, the interval between the transition stripes in the longitudinal direction within a burst of the group is substantially identical and is less than the minimum servo gap. The media is subject to substantial velocity variation. For example, the media may accelerate from a stop to a nominal speed. It is desirable to detect the servo as early as possible to increase the speed to data. Thus, once a gap is acquired, the present invention adaptively maintains the gap detection as the acceleration continues.

A servo system sensor, such as a servo read head, senses the transition stripes in the longitudinal direction of the media during relative motion with respect to the media, and reads the servo track transitions at its lateral position on the servo track. The servo system employs the intervals between oppositely sloped pairs of the transition stripes to determine the lateral position of the sensor.

A group interval detector coupled to the sensor detects the timing interval between the same slope transition stripes of two sequential groups of bursts. A divider coupled to the group interval detector and having an output, divides the detected group timing interval by a predetermined divisor to provide an updated divided timing interval gap detection threshold at the output.

A sequential stripe interval detector coupled to the sensor measures the timing interval between the sequential sensed transition stripes, and a comparator coupled to the sequential stripe interval detector and to the divider output, and having a gap detect output, compares the divided timing interval and the sequential timing interval, the comparator providing a servo gap identification signal at the gap detect output upon the measured sequential timing interval at least equaling the divided timing interval gap detection threshold, thereby identifying the servo gap. Each servo gap in the timing based servo system is identified in this manner.

The gap detection threshold is continually updated, automatically accommodating tape velocity variation. The servo system additionally has a "valid" output indicating the validity of the detected group timing interval. The detector additionally is coupled to the "valid" output, and responds to each "valid" signal at the "valid" output, repeating operation of the divider to update the divided timing interval gap detection threshold, and to repeat operation of the sequential stripe interval detector and the comparator with the updated gap detection threshold to continue to identify the servo gaps.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
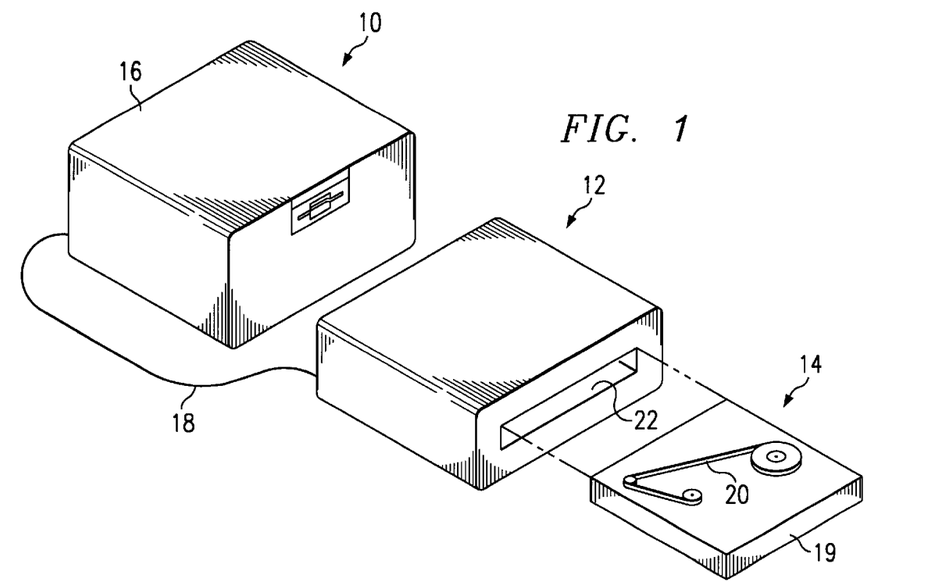
FIG. 1 is a perspective view representation of a tape drive data storage device and associated tape cartridge in accordance with an embodiment of the present invention.
Figure 2:
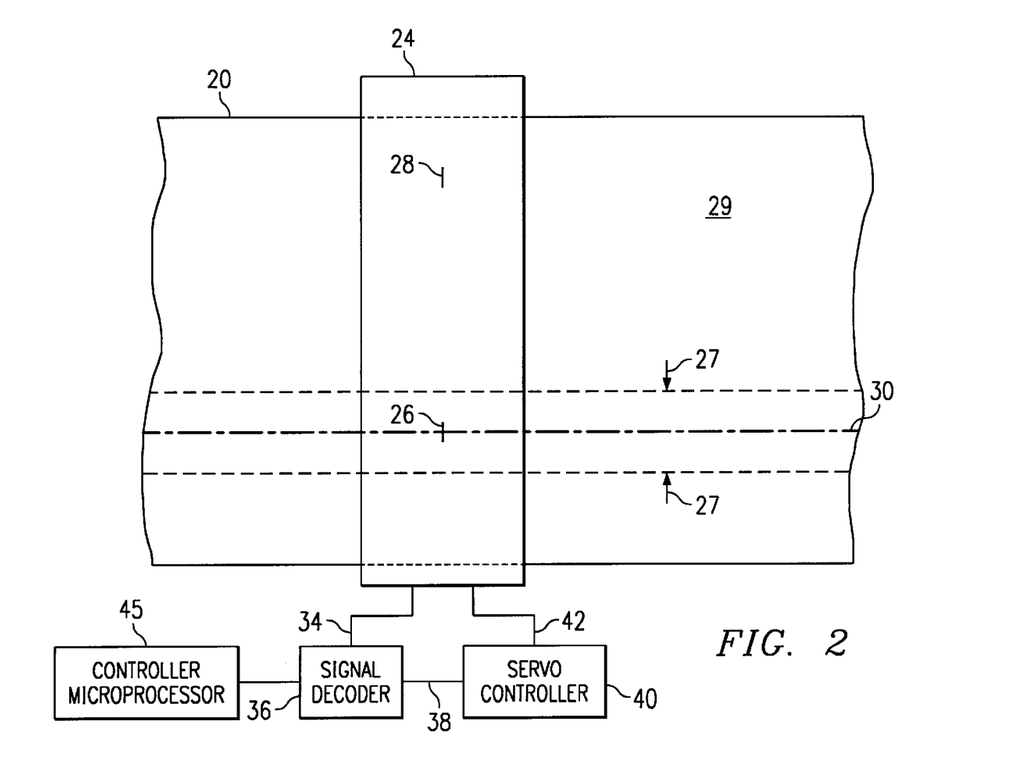
FIG. 2 is a schematic representation of a tape drive data storage device with a servo system, and an associated tape cartridge showing one servo track in accordance with an embodiment of the present invention.

Referring to FIGS. 1 and 2, a data storage system is illustrated including tape drive data storage device 12, such as a magnetic tape drive, and associated tape cartridge 14, with a servo system having a servo gap detector in accordance with the present invention. Referring to FIG. 1, the tape drive 12 accepts tape cartridge 14, which stores data in the form of data sets to be read and/or written by the tape drive 12, and is connected to a host processor 16 by a cable 18. The tape cartridge 14 comprises a housing 19 containing a length of tape 20, such as magnetic tape. Alternatively, the tape drive 12 may comprise an optical tape drive, and tape cartridge 14 may comprise an optical media. The tape drive 12 includes a receiving slot 22 into which the cartridge 14 is inserted. The host processor 16 can comprise any suitable processor, for example, a workstation such as the IBM "RS6000", or can be a systems computer, such as the IBM "AS400". The tape drive 12 is preferably compatible with the associated host processors and can assume any one of a variety of cartridge or cassette linear formats. Examples of such tape drives include the IBM "3490" tape drive units, or IBM "3570" tape drive units, or "Digital Linear Tape", or "Travan" compatible tape drives, some of which employ two reel cartridges 14 and others employ single reel cartridges.

Referring to FIG. 2, such tape drives typically include spindle drive motors (not shown) for rotating the reels of the cartridge 14 to move the tape 20 across a head assembly 24. The head assembly is shown in solid lines and includes a relatively narrow servo read head 26 that detects a servo pattern recorded in a servo track 27 of the tape. A data head 28 of the head assembly is typically larger than the servo head and is positioned over a data track region 29 of the tape containing multiple data tracks for reading data recorded in a data track, or for writing data in a data track. FIG. 2 shows a single servo read head and a single data head for simplicity of illustration. Those skilled in the art will appreciate that most tape systems have multiple parallel servo tracks, multiple servo read heads, and multiple data read and write heads.

The servo track centerline 30 is indicated as extending along the length of the tape 20. The servo read head 26 is relatively narrow and has a width substantially less than the width of the servo track 27. In accordance with the incorporated '384 patent, the tape is moved longitudinally across the tape head assembly 24 so that the servo track 27 is moved linearly with respect to the servo head 26. When such movement occurs, the servo pattern of magnetic flux transitions is detected by the servo read head 26 so that it generates an analog servo read head signal that is provided via a servo signal line 34 to a signal decoder 36. The signal decoder processes the servo read head signal and generates a lateral position signal that is transmitted via position signal lines 38 to a servo controller 40. The servo controller generates a servo control signal and provides it on control lines 42 to a servo positioning mechanism at head assembly 24. The servo positioning mechanism responds to the control signal from the servo controller by moving the assembly including servo head 26 laterally with respect to the servo track centerline 30 to reach the desired servo track or to maintain the servo head 26 centered with respect to the servo track centerline 30. The servo system signal decoder 36 and servo controller 40 are coupled to a drive controller microprocessor 45, which operates the drive 12 and controls the corresponding servo processes.

Figure 3:
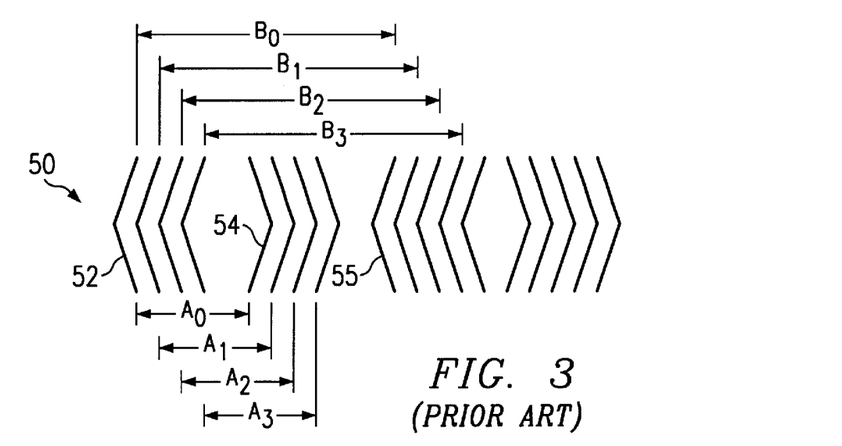
FIGS. 3 and 4 are respectively representations of a timing based servo pattern and a combined servo and encoded data pattern with servo gaps which may be detected in accordance with the present invention.

FIG. 3 illustrates an exemplary timing based servo pattern in accordance with the '384 patent, which employs servo gaps detected in accordance with the present invention. Those skilled in the art will recognize that the slanted lines represent stripes of magnetic flux transitions or areas of magnetic flux that extend across the width of a servo track. In the case of areas of magnetic flux, the edges comprise flux transitions that are detected to generate the servo read head signal. The transitions have two magnetic polarities, one on each edge of a stripe. When the servo read head 26 crosses a transition, it produces a pulse whose polarity is determined by the polarity of the transition. For example, the servo head might produce positive pulses on the leading edge of each stripe and negative pulses on the trailing edge. The servo pattern 50 comprises repeating transitions having two different orientations. First burst of stripes or "chevrons" 52 extend across the width of a servo track and have a first orientation slanted with respect to the longitudinal direction of the track. Second burst of stripes or chevrons 54 also extend across the width of a servo track, but have a slanted orientation opposite to that of the chevrons 52.

Each chevron in burst 52 and the corresponding chevron in burst 54 comprise a pair of transitions separated by a predetermined distance $A_0$, $A_1$, $A_2$ and $A_3$. In the arrangement of the '384 patent, each of the predetermined distances is identical. The apex of each of the chevrons is located at the servo track centerline. Alternatively, the chevrons in bursts 52 and 54 form slanted lines represented by the top portions of the diamond-shaped chevron patterns.

Thus, as the tape is moved linearly with respect to a servo read head, the servo read head generates an analog servo read head signal having peaks whose peak-to-peak timing varies as the 40 head is moved across the width of the track. This variation in timing is used to determine the relative lateral or transverse position of the magnetic servo read head within the servo track.

Typically, only the leading or the trailing edges of the transitions are employed for the servo timing measurement.

Hereinafter, "non-parallel transition stripes" or "sloped pairs of transitions" or similar nomenclature refers to a pair of transitions, at least one of which transitions is slanted, or otherwise continuously longitudinal variable across the width of the servo track, with respect to the paired transition.

The servo patterns illustrated in FIG. 3 include a first set of two bursts comprising oppositely sloped pairs of transition chevrons 52 and 54, and a second set of bursts of similarly sloped transition chevrons 52 and 55. Transitions 52 and 55 are separated by a predetermined distance $B_0$, $B_1$, $B_2$ and $B_3$. The A and B intervals are used to generate a position signal that is independent of tape speed. It is important that only the A intervals, which are between oppositely sloped chevrons at the opposite sides of the diamond-shaped patterns vary with transverse position. The B intervals are constant, regardless of position. Thus, the position signal is generated by timing the intervals and calculating their ratio.

The ability to ascertain whether diamonds or like pairs are being read may be determined by having different servo gaps between the groups of chevrons. Alternatively, the sequence of servo signals can be differentiated by different numbers of chevrons in alternating groups of diamonds. As shown in FIG. 3, 4 chevrons 52 are provided in the first group, and 5 chevrons 55 are provided in the second group.

Figure 4:
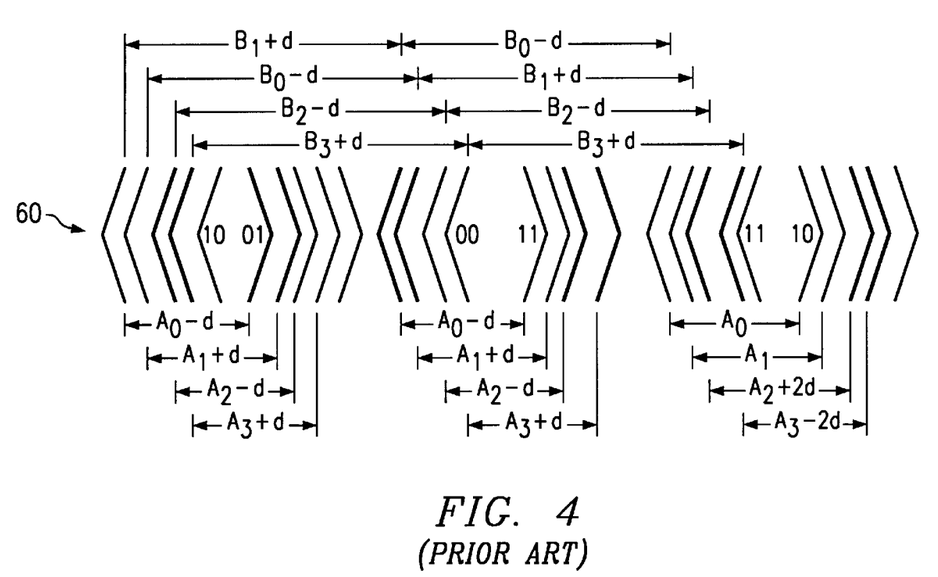

A coassigned Albrecht et al. application, Ser. No. 08/859,830, discloses a magnetic tape media having data information superimposed on prerecorded timing based servo information. At least two transitions of the repeated pairs in a group are shifted longitudinally with respect to other of the transitions, the shifted transitions comprising the superimposed data information. FIG. 4 illustrates burst patterns 60 in which the transitions of FIG. 3 are shifted longitudinally with respect to the tape to encode data into the servo track. The data may be encoded in any manner so long as the servo timing remains correct.

For example, a chevron may be moved in a first direction to encode a "1" and moved in the opposite direction to encode a "0".

For the servo loop, the Position Error signal is determined from the equation:

$$PES = REFERENCE - (A0+A1+A2+A3)/(B0+B1+B2+B3)$$

Where A0 is the distance between the first chevron of the forward group and the first chevron of the reverse group, A1 is the distance between the second chevron of the forward group and the second chevron of the reverse group, etc. Likewise, B0 is the distance between the first chevron of the forward group and the first chevron of the next forward group, B1 is the distance between the second chevron of the forward group and the second chevron of the next forward group, etc. Alternatively, the "B" measurements may be made between chevrons of the reverse groups. The measurements may vary from that of the forward groups by a fixed offset, depending on the servo format.

In both the timing based servo pattern of FIG. 3 and the combined data and timing based servo pattern of FIG. 4, the determination of the location of the interburst, or servo, gaps is required in order to identify the specific chevrons of the patterns.

Figure 5:
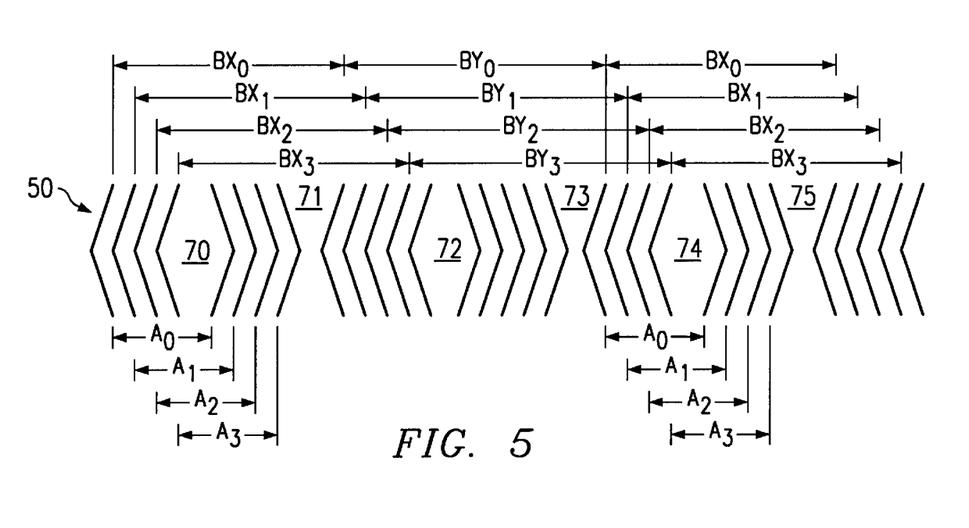
FIG. 5 is a representation of a timing based servo pattern having alternating groups of two bursts respectively of 4 and of 5 transition stripes illustrating intervals between ones of the transition stripes.

The timing based servo patterns of FIG. 3 are expanded in FIG. 5 to illustrate the continuing A and B intervals over additional bursts in the 4 and 5 transition patterns, illustrating the servo gaps 70–75 separating the bursts. As the servo sensor moves toward the top edge of the chevron patterns, servo gaps 70, 72 and 74 decrease in length, and servo gaps 71, 73 and 75 increase in length. Conversely, as the servo sensor moves toward the center of the chevron patterns, servo gaps 71, 73 and 75 decrease in length, and servo gaps 70, 72 and 74 increase in length.

Figure 6:
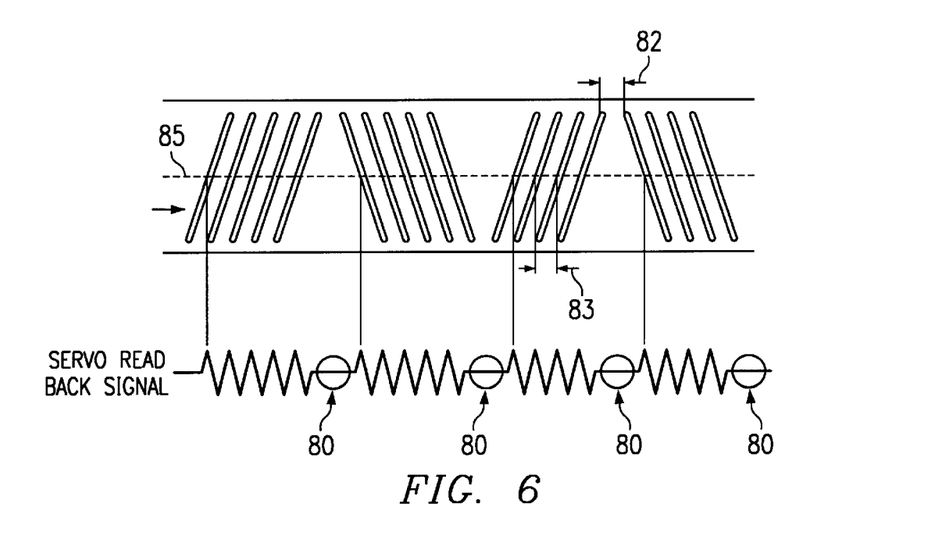
FIG. 6 is a representation of a timing based servo pattern of alternating groups of bursts of 4 and of 5 transition stripes and a representation of the pulse signals detected from sensing the transitions.

FIG. 6 is a representation of a timing based servo pattern of alternating groups of bursts of 4 and of 5 transition stripes, comprising the upper half of the chevrons of FIG. 5, and a representation of the pulse signals detected from sensing the transitions. The servo gaps 80 at their minimum length 82 remain greater in length than the interval 83 between adjacent stripes of a burst. Thus, when the tape media is moving at a constant velocity, it is possible to distinguish the servo gaps from the stripe intervals by setting a threshold for the servo gaps at a timing interval greater than that of the stripe intervals.

As discussed above, the tape media is subject to variations in velocity. Hence, should the velocity of the tape slow, the stripe intervals become longer, and may exceed the servo gap detection threshold. Also, should the velocity of the tape media increase, the time intervals of the servo gaps may fall below the threshold, so that only some, or no, servo gaps are detected. Thus, the locations of the bursts cannot be detected and the servo A intervals cannot be tracked, losing the track following capability. As the result, the track following servo may be unusable until the tape media reaches a nominal velocity.

However, most tape drives employ a search capability which operates at a higher tape media velocity than do the read and the write operations. Hence, the threshold must have a means of adjustment.

Certain high capacity and high speed tape drives are equipped with an incremental encoder, or tachometer, which may be used with appropriate microcode in the tape control unit to determine the instant speed of the tape media and calculate a threshold and identify the gaps. As discussed above, cost reduction is of key importance in modern tape drives, so that it is desirable to provide an alternative to the expensive precision incremental encoders.

Ideally, the servo gap detection threshold is updated during the tape speed variation, or at least as soon as possible after the tape speed is varied. Conventionally, the tape speed and the servo gap detection threshold are calculated by the microcode at a tape transport timer interrupt, and the threshold is set as a register value if needed. The calculation and update of the servo gap detection threshold are a microcode overhead. Further, the control unit processor performs a number of interrupt driven operations, and may be unable to service the servo gap interrupt and then calculate the servo gap detection threshold at every tape transport timer interrupt. Moreover, under certain circumstances, as discussed above, the microcode may not monitor and update the threshold and identify the gaps even though the tape speed is still available.

Thus, in accordance with the present invention, and referring to FIGS. 5 and 6, even as the trail 85 of the servo sensor moves laterally of the tape media, the lengths of the B intervals remain the same. The present invention determines a relationship between the B intervals and the desired servo gap detection threshold and constantly updates the timing threshold based upon the measured timing of the B intervals, and does so without the necessity of measuring the precise velocity of the tape media to do the updates. Only an estimate of the tape media velocity is employed to make the first acquisition of the servo gaps, and the updates continue through substantial variation in tape media velocity without the necessity to interrupt the microprocessor.

Thus, the tape may be accelerated from a stop to a nominal speed and, once a gap is acquired, the present invention adaptively maintains the gap detection as the acceleration continues. This provides early detection of the servo and results in rapid speed to data.

Figure 7:
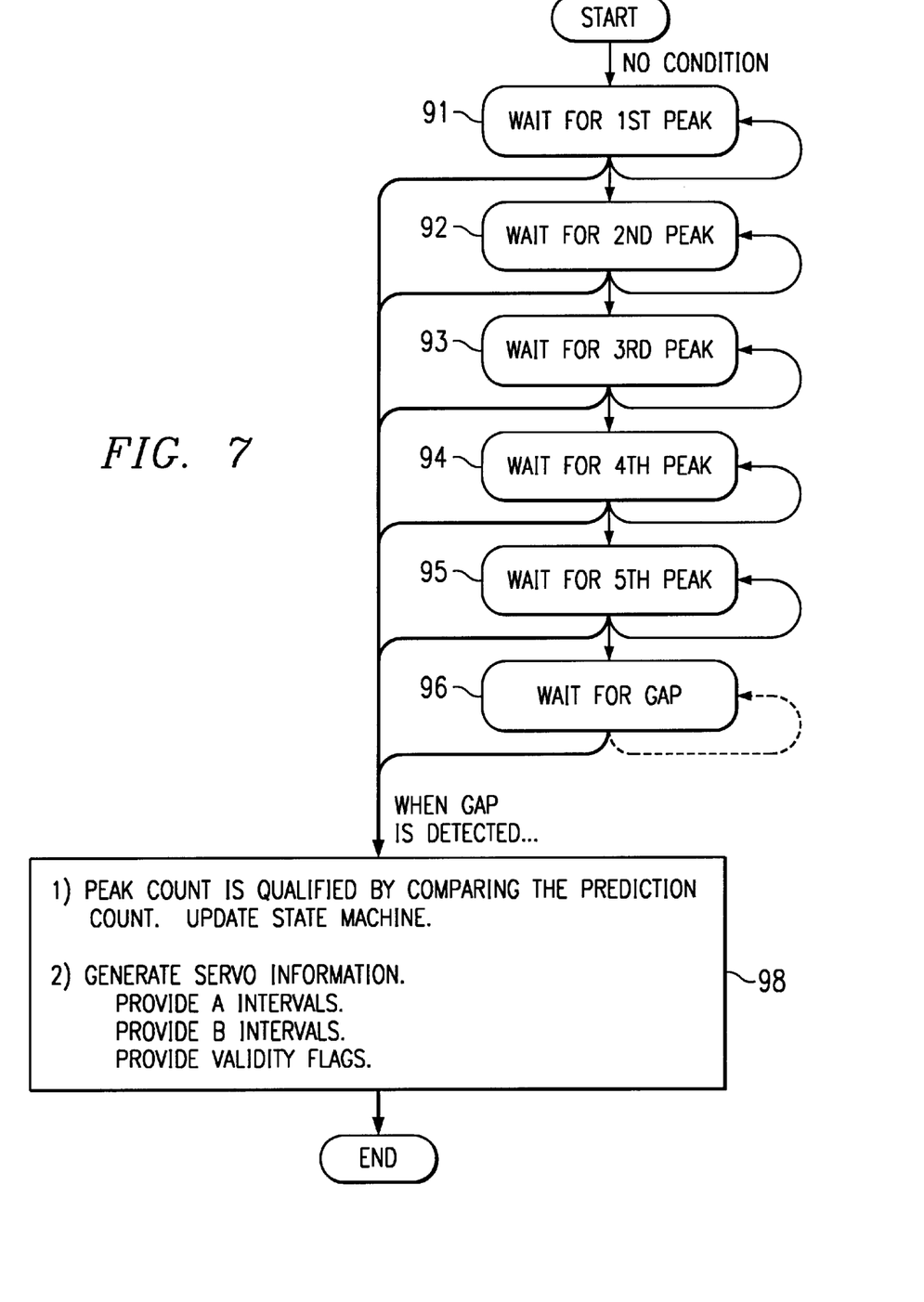
FIG. 7 is a state diagram of the detection of a servo burst and gap.

Referring to FIGS. 2 and 7, the signal decoder 36 processes the servo read head signal of FIG. 6 for each burst of FIG. 5 and calculates the B intervals and the A intervals, and provides validity flags to indicate whether the calculated A intervals and B intervals are valid. The state machine of FIG. 7 of the servo decoder 36 waits for each of the signal peaks representing a transition in states 91–95 and waits for a gap in state 96. The signal peaks represent only the leading, or alternatively the trailing, edge of each transition. State 95 is skipped when the predicted burst is a 4 stripe burst. The timing of each of the peaks of the transition pulses is detected, and as each transition is detected, a peak counter of the state machine is incremented. Thus, in step 98, the servo decoder 36 first qualifies the peak count by comparison to the prediction count. If the counts are correct, the state machine is updated. The update of the state machine then predicts the count of the next burst. The A intervals and the B intervals are then calculated from a burst of the previously detected group of bursts, and validity flags are set, to indicate that the calculated A and B intervals are "valid" or "invalid".

Referring to FIG. 5, the servo decoder separately calculates the B intervals between a 4 transition burst and a 5 transition burst, spanning a 4 transition burst (BX), and calculates the B intervals between a 5 transition burst and a 4 transition burst, spanning a 5 transition burst (BY). The B intervals spanning the 5 transition burst (BY) are longer than those spanning the 4 transition burst (BX). The B intervals are separately calculated, so that, should one of the B intervals become invalid, the other of the B intervals may still be valid. The B intervals are called the group intervals because the comprise the timing intervals between bursts of adjacent groups. Alternatively, the B interval validity is called "pair valid" or "pair invalid" to indicate the validity of the detection of the interval between the pair of transitions comprising the detected B interval.

Figure 8:
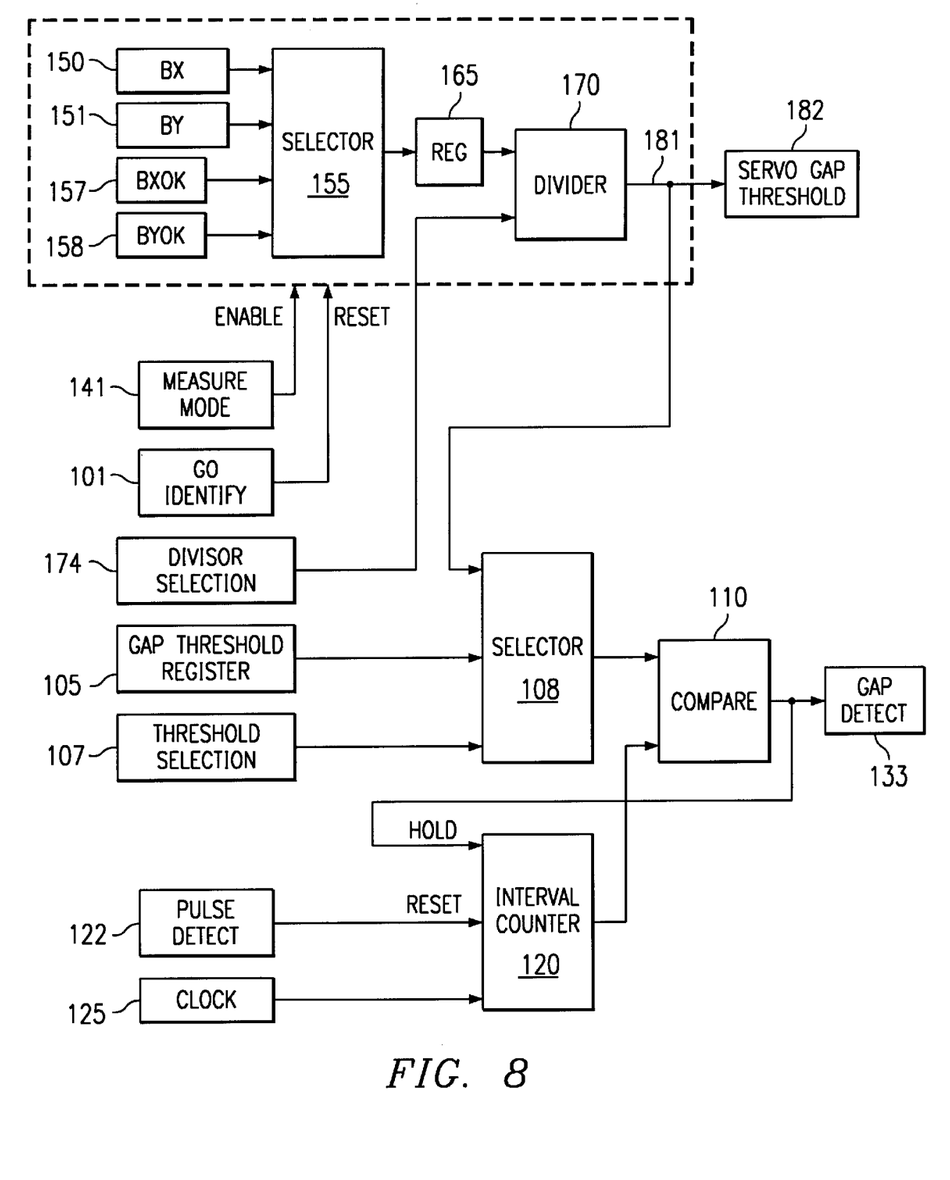
FIG. 8 is a block diagram of an embodiment of a servo gap detector in accordance with the present invention.
Figure 9:
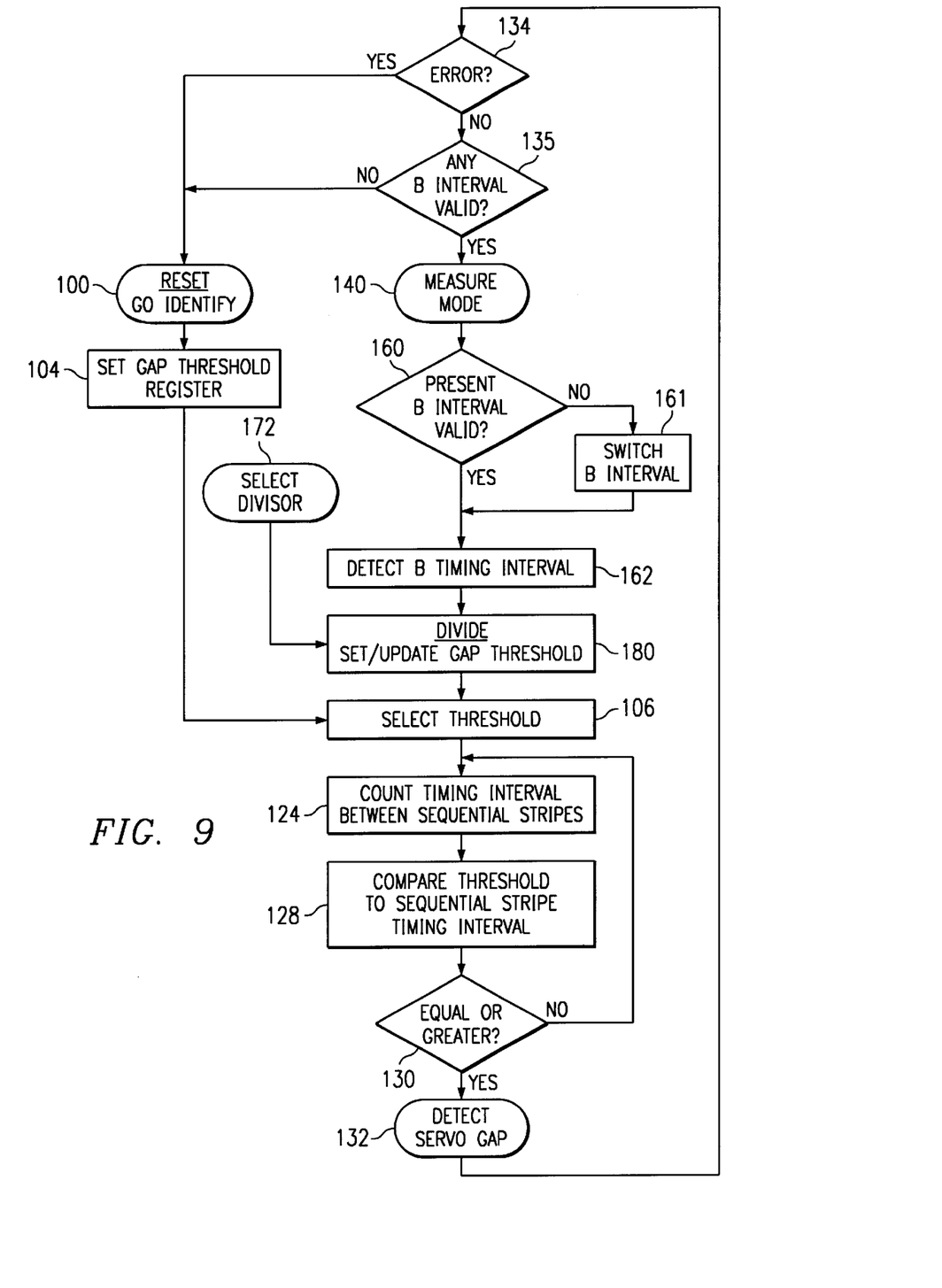
FIG. 9 is a flow chart depicting an embodiment of the method of the present invention.

FIGS. 8 and 9 respectively illustrate an embodiment of a servo gap detector and an embodiment of a servo gap detection method in accordance with the present invention, employing the B interval detection and validity flags of the state machine of FIG. 7, and which provide the servo gap detection of state 96 of the state machine.

The first step 100 in the embodiment of the method of the present invention of FIG. 9 is initiated by a command at input 101 of the detector of FIG. 8, called "GO IDENTIFY", to establish the initial identification of a servo gap. In step 104, a predetermined gap detection threshold is set in gap threshold register 105. The predetermined gap detection threshold is set at a value related to the velocity of the tape media. As one example, the current of a spindle drive motor may be monitored to estimate the velocity of the tape media, and the predetermined threshold calculated by the controller microprocessor 45 from the estimated velocity and entered into register 105. In step 106, a command is supplied at input 107 to operate selector 108 to select the predetermined threshold from gap threshold register 105 and supply the predetermined threshold value to comparator 110.

An interval counter 120 is reset by the leading edge of the each detected transition, such as depicted in FIG. 6, as supplied from the servo system by pulse detector 122. Thus, the interval counter conducts step 124, counting the output pulses of a clock 125 in the interval between sensed transition pulses from pulse detector 122, thereby detecting the timing interval between sequential stripes. When the next pulse is detected, the interval counter 120 is again reset to zero and again begins counting the output of clock 125 to define the timing of the interval to the next detected transition.

In step 128, comparator 110 compares the predetermined threshold to the detected sequential timing interval. The predetermined threshold is set at what should be a greater time interval than the timing interval between adjacent stripes of a burst, and the value of interval counter will not reach the threshold value before being reset. Hence, step 130 comprises the result of the comparison by comparator 110. If the value of the interval counter 120 does not equal that of the predetermined threshold, "NO", the process cycles back, the pulse detector 122 provides the next pulse, resetting the interval counter 120 to zero, and begins the next interval count.

If comparator 110, in step 130, indicates that the interval count equals the predetermined threshold, a servo gap has been detected, in step 132, and providing a gap detection signal on output 133. Detection of the servo gap causes the state 96 of FIG. 7 to sequence to step 98 and provide the servo information and validity flags. Several attempts may be required before the servo gap is actually detected and the servo information is valid, without error. This is depicted in FIG. 9 by steps 134 and 135. Step 134 detects any error, "YES", in the results of step 98 in FIG. 7. One example of an error is that the peak count is not qualified. If there is no error, "NO", step 135 detects whether either of the B intervals, BX or BY, is valid. If neither is valid, "NO", or if there is an error, the process cycles back to repeat the "GO IDENTIFY" process.

If there is no error and one of the B intervals is valid, the servo gap has been initially acquired, and the method of the present invention to adaptively detect the servo gaps in a timing based servo pattern prerecorded on a media begins as the "MEASURE MODE" 140 indicated at input 141.

The B intervals BX and BY are respectively provided at inputs 150 and 151 of selector 155, and the respective "VALID", or "pair valid", signals are provided at inputs 157 and 158 to the selector. The selector 155 either has an initial preset, or retains the previous setting, to select one of the B intervals BX or BY. Based on that selection, step 160 detects either input 157 or 158 to determine whether the presently selected B interval is valid. If not, "NO", selector 155, in step 161, switches to the other B interval, and, in step 162, detects the B interval, storing the interval time in register 165.

In accordance with the present invention, a divider 170 divides the detected group B timing interval by a predetermined divisor to provide a divided timing interval gap detection threshold. The divisor is selected in step 172 at input 174. It is preferred that the divisors of divider 170 are base-2 numbers. Thus, the division comprises selecting a predetermined number of high order bits of the B timing interval. Should a single divisor be usable in a given format, the base-2 number division is achieved by a hard wired bit shift which does not require any additional hardware.

The predetermined divisor of the divider 170 comprises a value which produces a threshold longer than the timing interval between sequential transition stripes of the bursts, and which produces a threshold shorter than the timing interval of the gap at the minimum spacing at an edge of the servo pattern.

The capability of selecting different divisors at input 174 in step 172 allows the servo decoder 36 to be employed with alternative types of timing based servo tracks having different relationships between the servo gaps and the intervals between stripes in a burst. An example of a divisor comprises "64", or 6 bits.

As the result of the division, in step 180, of the detected timing of the group B interval, the divided threshold timing precisely tracks the velocity of the tape media. The divided timing interval gap detection threshold is provided at output 181 from the divider 170. The output is also supplied at a detector output 182 for other uses by the servo decoder.

In "MEASURE MODE", step 106 selects, at threshold selection input 107, the divided timing interval gap detection threshold. The selection is made by selector 108 and comparator 110, in step 128, compares the divided timing interval and the sequential timing interval from interval counter 120 generated in step 124 from clock 125. The comparator 110 provides a servo gap identification signal at the gap detect output 133 upon the measured sequential timing interval at least equaling the divided timing interval gap detection threshold, in step 130, thereby detecting the servo gap in step 132.

Should the value of the interval counter 120 not reach the threshold value before being reset by pulse detector 122, the sequentially detected transition stripes are within a burst, and step 130, "NO", causes the process to cycle back to step 124 and again count the output pulses from clock 125.

In the embodiment of FIG. 8, the servo gap detection output of the comparator 110 is fed back to the interval counter 120 to hold the count and latch the detection. Subsequently, when the next stripe transition is detected by pulse detector 122, the interval counter is once again reset to zero.

In accordance with the present invention, the gap detection measurement process, "MEASURE MODE", continues throughout changes in the velocity of the tape media.

Should an error occur in the servo detection process as detected in step 134, "YES", such as the stoppage of the tape media so that no transitions are detected, or both group B intervals be invalid as detected in step 135, "NO", step 100 resets the process. Threshold selector 108 is then operated by input 107 to block the next divider threshold output 181 and to provide the predetermined threshold setting 105 as an interim threshold setting. Subsequently, or once the tape begins movement again, or a B interval becomes valid, the predetermined threshold 105, also called a "seed threshold", will once again initially acquire the servo gap, which is then continually tracked in accordance with the present invention.

Those of skill in the art will envision alternatives to the specific arrangement of the embodiment of FIG. 8 and of the specific steps of the method of FIG. 9.

While the preferred embodiments of the present invention have been illustrated in detail, it should be apparent that modifications and adaptations to those embodiments may occur to one skilled in the art without departing from the scope of the present invention as set forth in the following claims.

We claim:

1. A detector for adaptively detecting servo gaps in a timing based servo pattern prerecorded on a media, said timing based servo pattern having groups of repeated pairs of non-parallel transition stripes arranged in two bursts, one of each of said pairs in one of said bursts and separated by an "A" interval, said bursts each separated by servo gaps whose length is variable in the longitudinal direction of said media based on the lateral position on said servo pattern, intervals between said transition stripes in said longitudinal direction within a burst of said group being substantially identical and less than the minimum said servo gap, said media subject to velocity variations, in a servo system having a sensor which senses said transition stripes in said longitudinal direction of said media during relative motion with respect to said media, and a group interval detector coupled to said sensor detecting a "B" timing interval between parallel said transition stripes of two sequential said groups of bursts and spanning two said servo gaps, said detector comprising:

a divider coupled to said group interval detector and having an output, said divider dividing said detected group "B" timing interval by a predetermined divisor to provide a divided timing interval gap detection threshold at said output;

a sequential stripe interval detector coupled to said sensor measuring the timing interval between sequential said sensed transition stripes; and a comparator coupled to said sequential stripe interval detector and to said divider output, and having a gap detect output, said comparator comparing said divided timing interval and said sequential timing interval, said comparator providing a servo gap identification signal at said gap detect output upon said measured sequential timing interval at least equaling said divided timing interval gap detection threshold.

2. The detector of claim 1, wherein said servo system additionally has a "valid" output indicating the validity of said detected group "B" timing interval, and wherein said detector additionally comprises a "valid" input coupled to said "valid" output, said detector responding to a "valid" signal at said "valid" output to repeat operation of said divider to update said divided timing interval gap detection threshold, and to repeat operation of said sequential stripe interval detector and said comparator.

3. The detector of claim 2, wherein said servo system additionally has an "error" output indicating an error of said detected group "B" timing interval, and wherein said detector additionally comprises an "error" input coupled to said "error" output, said detector responding to a "error" signal at said "error" output to terminate operation of said divider, whereby the present said divided timing interval gap detection threshold is not updated.

4. The detector of claim 3, additionally comprising a threshold register providing at an output a predetermined threshold setting related to an estimated velocity of said media, and wherein said detector additionally comprises a selector coupled to said "error" output, to said threshold register output and to said divider threshold output, responding to said "error" signal to block said divider threshold output and to provide said predetermined threshold setting as an interim threshold setting.

5. The detector of claim 4, wherein said divider additionally comprises a "reset" input coupled to said detector "error" output, said divider responding to said "error" signal, and, upon absence of said "error" signal and said detected group "B" timing interval becoming available as indicated at said "valid" input, again dividing said detected group "B" timing interval by said predetermined divisor to provide a divided timing interval gap detection threshold at said divider threshold output.

6. The detector of claim 1, wherein said predetermined divisor of said divider comprises a value which produces a threshold longer than the timing interval between sequential said transition stripes of said bursts, and which produces a threshold shorter than the timing interval of said gap at the minimum spacing at an edge of said servo pattern.

7. The detector of claim 6, wherein said predetermined divisor of said divider comprises a base-2 number.

8. The detector of claim 6, wherein said timing based servo pattern comprises alternating groups of 4 and of 5 repeated pairs of non-parallel transition stripes, each of said groups comprising two bursts of said transition stripes, wherein said group timing interval detector detects said "B" timing interval between corresponding said transition stripes of two of said groups of said bursts having the same number of said transition stripes, extending across a complete set of said alternating groups and said two said servo gaps, and wherein said predetermined divisor of said divider is based upon the full length of said complete set of said alternating groups.

9. The detector of claim 8, wherein said media is magnetic tape and wherein said servo system group timing interval detector has first and second group interval detectors coupled to said sensor respectively detecting the timing interval between said corresponding transition stripes of two of said 4 pair bursts and of two of said 5 pair bursts, and said servo system additionally has a "pair valid" output indicating current validity of one of said first and said second group interval detectors, and wherein said divider additionally comprises a group interval selector coupled to said "pair valid" output, selecting the one of said first and said second group interval detectors indicated as being valid by said "pair valid" output.

10. The detector of claim 1, wherein said sequential stripe interval detector comprises a counter, measuring each of said timing intervals by counting at a predetermined frequency.

11. A servo system for sensing a timing based servo pattern prerecorded on a media, and for adaptively detecting longitudinal servo gaps in said prerecorded timing based servo pattern, said timing based servo pattern having groups of repeated pairs of non-parallel transition stripes arranged in two bursts, one of each of said pairs in one of said bursts and separated by an "A" interval, said bursts each separated by servo gaps whose length is variable in the longitudinal direction of said media based on the lateral position on said servo pattern, intervals between said transition stripes in said longitudinal direction within a burst of said group being substantially identical and less than the minimum said servo gap, said media subject to velocity variations, said servo system comprising:

a sensor which senses said transition stripes in said longitudinal direction of said media during relative motion with respect to said media;

a group interval detector coupled to said sensor detecting a "B" timing interval between parallel said transition stripes of two sequential said groups of bursts and spanning two said servo gaps;

a divider coupled to said group interval detector and having an output, said divider dividing said detected group "B" timing interval by a predetermined divisor to provide a divided timing interval gap detection threshold at said output;

a sequential stripe interval detector coupled to said sensor measuring the timing interval between sequential said sensed transition stripes; and a comparator coupled to said sequential stripe interval detector and to said divider output, and having a gap detect output, said comparator comparing said divided timing interval and said sequential timing interval, said comparator providing a servo gap identification signal at said gap detect output upon said measured sequential timing interval at least equaling said divided timing interval gap detection threshold.

12. The servo system of claim 11, wherein said servo system additionally comprises a "valid" group interval detector determining the validity of said detected group "B" timing interval, said "valid" group interval detector having a "valid" output, and wherein said servo system additionally responds to a "valid" signal at said "valid" output to repeat operation of said divider to update said divided timing interval gap detection threshold, and to repeat operation of said sequential stripe interval detector and said comparator.

13. The servo system of claim 12, wherein said servo system additionally comprises a group interval error detector for determining an error of said detected group "B" timing interval, said group interval error detector having an "error" output, said servo system responding to a "error" signal at said "error" output to terminate operation of said divider, whereby the present said divided timing interval gap detection threshold is not updated.

14. The servo system of claim 13, additionally comprising a threshold register providing at an output a predetermined threshold setting related to an estimated velocity of said media, and additionally comprising a selector coupled to said "error" output, to said threshold register output and to said divider threshold output, responding to said "error" signal to block said divider threshold output and to provide said predetermined threshold setting as an interim threshold setting.

15. The servo system of claim 14, wherein said divider additionally comprises a "reset" input coupled to said "error" output, said divider responding to said "error" signal, and, upon absence of said "error" signal and said detected group "B" timing interval becoming available as indicated at said "valid" input, again dividing said detected group "B" timing interval by said predetermined divisor to provide a divided timing interval gap detection threshold at said divider threshold output.

16. The servo system of claim 11, wherein said predetermined divisor of said divider comprises a value which produces a threshold longer than the timing interval between sequential said transition stripes of said bursts, and which produces a threshold shorter than the timing interval of said gap at the minimum spacing at an edge of said servo pattern.

17. The servo system of claim 16, wherein said predetermined divisor of said divider comprises a base-2 number.

18. The servo system of claim 16, wherein said timing based servo pattern comprises alternating groups of 4 and of 5 repeated pairs of non-parallel transition stripes, each of said groups comprising two bursts of said transition stripes, wherein said group timing interval detector detects said "B" timing interval between corresponding said transition stripes of two of said groups of said bursts having the same number of said transition stripes, extending across a complete set of said alternating groups and said two said servo gaps, and wherein said predetermined divisor of said divider is based upon the full length of said complete set of said alternating groups.

19. The servo system of claim 18, wherein said media is magnetic tape and wherein said group timing interval detector has first and second group interval detectors coupled to said sensor respectively detecting the timing interval between said corresponding transition stripes of two of said 4 pair bursts and of two of said 5 pair bursts, and said servo system additionally comprises a "pair valid" detector determining the current validity of one of said first and said second group interval detectors, and wherein said divider additionally comprises a group interval selector coupled to said "pair valid" detector, selecting the one of said first and said second group interval detectors indicated as being valid by said "pair valid" detector.

20. The servo system of claim 11, wherein said sequential stripe interval detector comprises a counter, measuring each of said timing intervals by counting at a predetermined frequency.

21. A method for adaptively detecting servo gaps in a timing based servo pattern prerecorded on a media, said timing based servo pattern having groups of repeated pairs of non-parallel transition stripes arranged in two bursts, one of each of said pairs in one of said bursts and separated by an "A" interval, said bursts each separated by servo gaps whose length is variable in the longitudinal direction of said media based on the lateral position on said servo pattern, intervals between said transition stripes in said longitudinal direction within a burst of said group being substantially identical and less than the minimum said servo gap, said media subject to velocity variations, said method in a servo system which senses said transition stripes in said longitudinal direction of said media during relative motion with respect to said media, comprising the steps of:

detecting a "B" timing interval between parallel said transition stripes of two sequential said groups of bursts and spanning two said servo gaps;

dividing said detected group "B" timing interval by a predetermined divisor, setting a gap detection threshold at said divided timing interval;

detecting the timing interval between sequential said sensed transition stripes; and identifying as a servo gap any said sequential timing interval at least equal to said divided timing interval gap detection threshold.

22. The method of claim 21, comprising the additional steps of determining the validity of said detected group "B" timing interval, and responding to said validity determining step determining that said detected group timing interval is valid, repeating said dividing step, thereby updating said divided timing interval gap detection threshold setting, and repeating said sequential stripe interval detecting and said identifying steps.

23. The method of claim 22, comprising the additional steps of determining an error of said detected group "B" timing interval, and responding to said error determining step determining that said detected group timing interval is in error, terminating said dividing step, whereby the present said divided timing interval gap detection threshold is not updated.

24. The method of claim 23, additionally comprising the steps of providing a predetermined threshold setting related to an estimated velocity of said media, and responding to said error determining step determining that said detected group timing interval is in error, to block said divider threshold output and to provide said predetermined threshold setting as an interim threshold setting.

25. The method of claim 24, additionally comprising the step of responding to said error determining step determining that said detected group "B" timing interval is in error, and, subsequently responding to said error determining step indicating no error, and responding to said validity determining step determining that said detected group "B" timing interval is valid, again conducting said dividing step dividing said detected group "B" timing interval by said predetermined divisor to provide a divided timing interval gap detection threshold.

26. The method of claim 21, additionally comprising the initial step of selecting said predetermined divisor to a value which will produce a threshold longer than the timing interval between sequential said transition stripes of said bursts, and which will produce a threshold shorter than the timing interval of said gap at the minimum spacing at an edge of said servo pattern.

27. The method of claim 26, wherein said selected predetermined divisor comprises a base-2 number.

28. The method of claim 26, wherein said timing based servo pattern comprises alternating groups of 4 and of 5 repeated pairs of non-parallel transition stripes, each of said groups comprising two bursts of said transition stripes, and wherein said group "B" timing interval detecting step comprises detecting the timing interval between said transition stripes of two sequential said groups of said bursts having the same number of said transition stripes, extending across a complete set of said alternating groups and said two said servo gaps, and wherein said predetermined divisor of said dividing step is based upon the full length of said complete set of said alternating groups.

29. The method of claim 28, wherein said media is magnetic tape and wherein said group "B" timing interval detecting step comprises respectively detecting the timing intervals between said corresponding transition stripes of two of said 4 pair bursts and of two of said 5 pair bursts, and comprising the additional step of determining the pair validity of one of said 4 pair burst detection and said 5 pair burst detection, and wherein said dividing step additionally comprising the step of responding to said pair validity step, selecting the one of said 4 pair burst and said 5 pair burst interval detection determined as being valid in said pair validity step.

30. The method of claim 21, wherein each of said timing intervals are measured by counting at a predetermined frequency.

* * * * *